United States Patent [19]

Wain

[11] 3,831,324

[45] Aug. 27, 1974

[54] ADJUSTABLE WORK PIECE HOLDER

[76] Inventor: John Wain, 28 Althea Rd. M6S2P2, Toronto, Ontario, Canada

[22] Filed: July 5, 1973

[21] Appl. No.: 376,417

[52] U.S. Cl. ................................. 51/237 R, 82/32
[51] Int. Cl. ........................................ B24b 41/06
[58] Field of Search ........ 51/103 C, 237 R, 237 CS, 51/236; 82/32

[56] References Cited
UNITED STATES PATENTS

| | | | |
|---|---|---|---|
| 198,211 | 12/1877 | Post | 82/6 |
| 680,167 | 8/1901 | Nitterauer | 82/28 |
| 2,444,559 | 7/1948 | Fay | 51/236 |

Primary Examiner—Othell M. Simpson
Assistant Examiner—Marc R. Davidson
Attorney, Agent, or Firm—George H. Riches

[57] ABSTRACT

This invention relates to a work piece holder for holding work pieces of variable lengths during grinding or other operations. A head block carrying a head center and a tail block carrying a tail center are adjustably slidably positioned on a base plate to hold the work piece. The base plate is secured in a conventional manner to a work table to provide for reciprocating motion of the work piece relative to a grinding wheel. The head block and tail block each have a body portion which are respectively located in first and second longitudinally extending steps in the base plate. The head block and tail block are releasably fixed relative to the base plate by anchor bolts which pass through their respective body portions to threadably engage mating anchor nuts located in parallel longitudinally extending slots in the steps of the base plate. The base plate and head and tail blocks are constructed to allow the body portions to laterally pass each other during adjustment to permit a portion of the head and tail blocks to extend beyond the ends of the base plate to hold longer work pieces without requiring a longer base plate. The head center is spring loaded and the tail center is vertically adjustable by a setscrew to permit the workpiece to be ground parallel or tapered.

7 Claims, 5 Drawing Figures

PATENTED AUG 27 1974 3,831,324
SHEET 1 OF 2

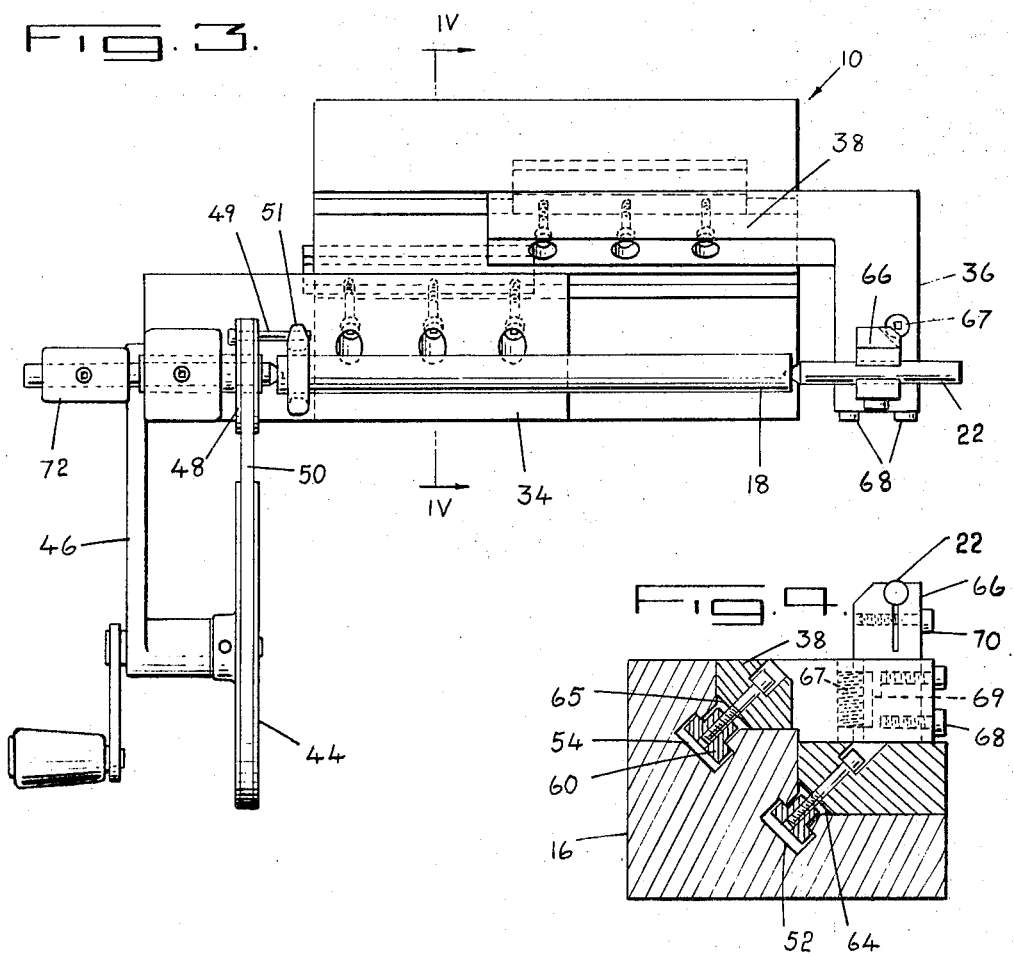

a
ADJUSTABLE WORK PIECE HOLDER

This invention relates generally to a work piece holder and more particularly to a holder for work pieces of variable lengths in a grinding machine or other operation.

Devices of this type generally have a head block and a tail block which are slidably positioned along a longitudinal axis on a base to receive the work piece between them. The base is in turn secured to a work table which provides reciprocating motion in a conventional manner to move the work piece relative to a grinding wheel. These previous devices have the disadvantage that both the head block and tail block move relative to the base along a single common longitudinal axis. Therefore, the theoretical maximum variation in length of work pieces which may be held by the device is less than the length of the base. In order to provide greater variation in lengths of acceptable work pieces, the base plates of these previous devices have become longer and thereby considerably more expensive to manufacture, heavier to install and cumbersome to operate.

Accordingly, it is an object of the present invention to at least partially overcome these disadvantages by providing a variable length work piece holder which is smaller, less expensive to manufacture, and more convenient to install and operate for any given maximum length of adjustment.

To this end in one of its aspects, the invention provides an adjustable work piece holder for holding a work piece having a head end and a tail end for grinding or other operation comprising a longitudinally extending base plate; a head block having a holding portion and a body portion, the holding portion having a head end engaging means, the head block being adapted to be slidably positioned relative to the base plate along a first longitudinal axis; a tail block having a holding portion and a body portion, the holding portion having tail end engaging means, the tail block being adapted to be slidably positioned relative to the base plate along a second longitudinal axis parallel to the first longitudinal axis; first complemental securing means adapted to releasably secure the body portion of the head block to the base plate in a first desired position along the first longitudinal axis; and second complemental securing means adapted to releasably secure the body portion of the tail block to the base plate in a second desired position along the second longitudinal axis, the second longitudinal axis being laterally spaced from the first longitudinal axis whereby longitudinal adjustment of the head and tail blocks to hold the work piece between the head end engaging means and the tail end engaging means may locate the body portion of the head block laterally adjacent the body portion of the tail block.

In another of its aspects, the invention further provides a device for holding a variable length work piece having a head end and a tail end during grinding comprising a base plate with a uniform step shaped cross section providing first and second steps with first and second slots extending respectively along the bight of the said steps, each slot having a uniform T-shaped cross section opening onto the respective step; a head block having a holding portion and a body portion, the holding portion including a head center secured thereto, the body portion being generally rectangular shaped and adapted to be slidably received in the first step of the base plate; a tail block having a holding portion and a body portion, the holding portion including a tail center secured thereto, the body portion being generally rectangular shaped and adapted to be slidably received in the second step of the base plate; anchor bolts adapted to be received in respective holes in the body portions of the head and tail blocks; and corresponding anchor nuts retained in the first and second slots, the anchor nuts adapted to respectively threadably receive the anchor bolts to lock the head block and tail block in desired positions along the steps to retain the work piece between the head center and tail center, whereby the head block, tail block and base plate are constructed to permit the said body portions to laterally pass each other during longitudinal adjustment to receive a longer work piece.

Further objects and advantages of the invention will appear from the following description taken together with the accompanying drawings in which:

FIG. 3 is a plan view of the embodiment of the invention shown in FIG. 1, shown holding a longer work piece;

FIG. 4 is a cross sectional view taken along line IV—IV in FIG. 3; and

FIG. 5 is a partial sectional view of the preferred embodiment of the invention in the position shown in FIG. 3.

Figure 1:
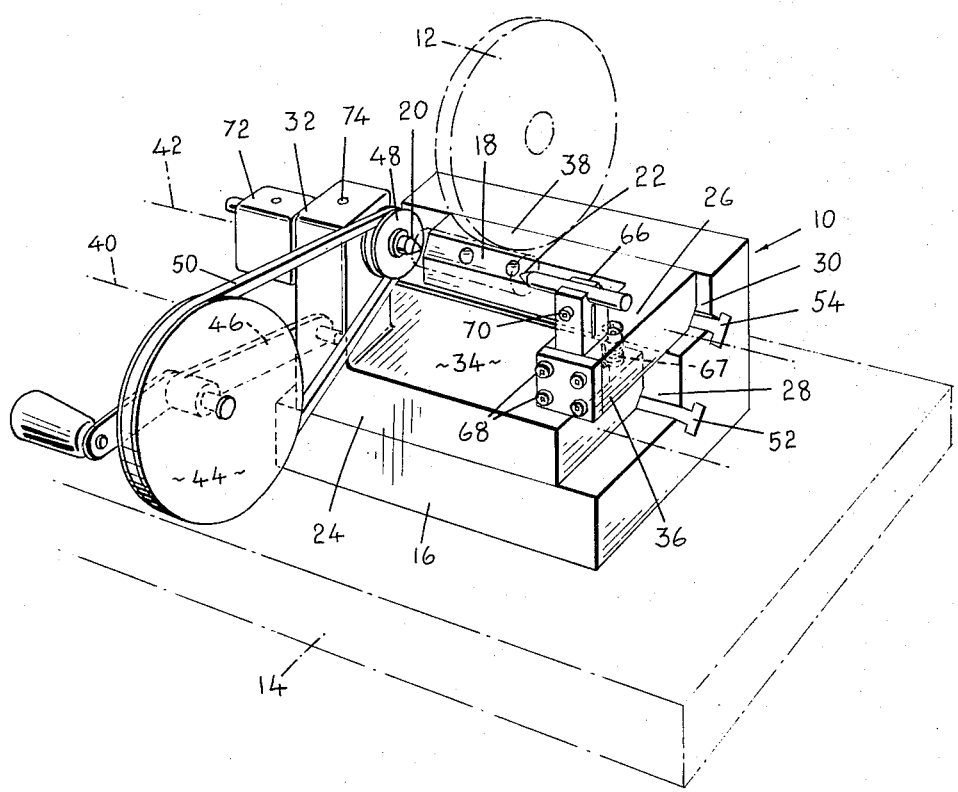
FIG. 1 is a perspective view of a preferred embodiment of the invention, shown holding a short work piece.

Reference is first made to FIG. 1 which shows a griding wheel 12, a work table 14 and a base plate 16. The griding wheel 12 is operatively connected to a grinding machine (not shown) in a conventional manner. A work piece 18 is held between a head center 20 and a tail center 22 which are respectively secured to an L-shaped head block 24 and an L-shaped tail block 26. The base plate 16 is secured to the work table 14 and is moved in a conventional manner to bring the work piece 18 into longitudinal reciprocating contact with the grinding wheel 12.

Figure 2:
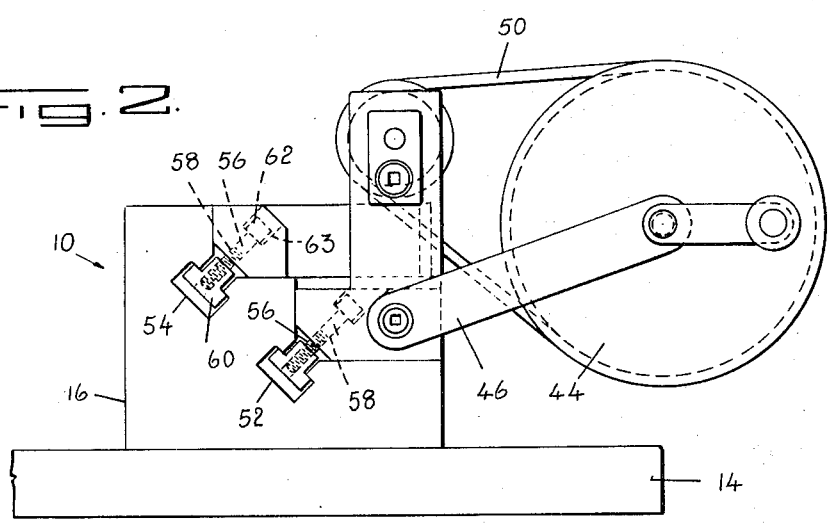
FIG. 2 is an elevation view from the left end of FIG. 1.

The base plate 16 has a uniform step shaped cross section to provide a first lower step 28 and a second upper step 30. The L-shaped head block 24 has an upright holding arm portion 32 projecting from a longitudinally extending body portion 34 which is slidably received in the first lower step 28 of the base plate 16. The L-shaped tail block 26 similarly has a holding arm portion 36 projecting outwardly from longitudinally extending body portion 38 which is slidably received in the second upper step 30 of the base plate 16. Therefore, as may be seen, the head block 24 and tail block 26 are designed to be slidably positioned relative to each other on the base plate 16 along first and second longitudinal axes 40, 42 respectively. A manually operated drive wheel 44 is fixed to the head block 24 by a bracket 46 to provide for rotation of pulley 48 through connecting belt 50. Pulley 48 has an eccentric pin 49 fixed thereto to engageably contact a lathe dog 51 connected to the work piece 18 to provide for rotation of the work piece in a conventional manner during grinding. The base plate 16 is formed to have first and second longitudinally extending slots 52, 54 extending respectively along the bight of the first and second steps 28, 30. As best seen in FIGS. 2 and 4, the slots 52, 54 are uniformly T-shaped in cross section and open onto the respective steps. The head block and tail block are connected to the base plate 16 by anchor bolts 56 which extend through bolt holes 58 in the respective body portions 34, 38 to engage mating T-shaped anchor nuts 60 which are shaped to be slidably retained in the respective slots 52, 54. Bolts 56 have bolt heads 62 which are recessed in seats 63 in the respective body portions 34, 38. As may be seen in FIG. 4, the body portions 34, 38, which are generally rectangular shaped, have beveled edges 64, 65 adjacent the slots 52, 54 to accomodate the anchor nuts 60.

Tail center 22 is held by clamping post 66, which in turn is secured in a vertically adjustable position to the holding arm portion 36 of the tail block 26 by bolts 68. Tail center 22 may be replaced by loosening screw 70 and sliding it out of the clamping post 66 in an apparent manner. The clamping post 66 may be easily vertically adjusted by rotating setscrew 67 to provide for parallel or tapered grinding of the work piece. As seen in FIGS. 3 and 4, setscrew 67 is threadably received in the holding arm portion 36 of the tail block 26 and is partially inset into a chamferred portion 69 of a corner of the clamping post 66. If necessary due to longitudinal thrust from the grinding wheel, the longitudinal position of head center 20 may be locked during operation by tightening set screw 74.

In use, this preferred embodiment of a work piece holder according to the invention may be adjusted to hold work pieces of varying lengths up to a length considerably longer than the length of the base plate 16. In making the adjustment to a different length of work piece, anchor bolts 56 are loosened and the head block 24 and tail block 26 are positioned along the longitudinal axes 40, 42 to have the head center 20 and tail center 22 approximately spaced to receive the work piece between them. The anchor bolts 56 are then tightened to securely lock the head block 24 and tail block 26 relative to each other and to the base plate 16. Each work piece of this length is then inserted between the head and tail centers 20, 22 by manually retracting spring block 72, positioning the work piece between the head and tail centers, and releasing the spring block to permit the head center to be biased into bearing contact with the work piece. The position of the head center 20 may then be locked by tightening setscrew 74. As clearly seen in FIG. 5, when the positions of the head and tail blocks 24, 26 are adjusted to hold a longer work piece 18, the holding arm portions 32, 36 extend beyond the ends of the base plate 16. As may be seen, the body portions 34, 38 of the head and tail blocks, 24, 26 must be shaped to laterally pass each other during such longitudinal adjustment of the head and tail blocks. Therefore, the maximum limit on the length of work piece which may be held by the holder is determined by the fact that in the fully extended position, sufficient anchor nuts 60 must be retained in the first and second slots 52, 54 to securely fix the head and tail blocks 24, 26 relative to the base plate 16. As a result, for a given desired range of acceptable lengths of work pieces, the cost, size and weight of the base plate may be subsantially reduced from previously known devices, thereby reducing operating inconvenience.

Although the disclosure describes and illustrates a preferred embodiment of the work piece holder according to the invention, it is to be understood that the invention is not restricted to this particular embodiment.

The embodiments of the invention in which an exclusive property or privilege is claimed are defined as follows:

1. An adjustable work piece holder for holding a work piece having a head end and a tail end for grinding or other operation comprising:
    a. a longitudinally extending base plate,
    b. a head block having a holding portion and a body portion, the holding portion having a head end engaging means, the head block being adapted to be slidably positioned relative to the base plate along a first longitudinal axis,
    c. a tail block having a holding portion and a body portion, the holding portion having tail end engaging means, the tail block being adapted to be slidably positioned relative to the base plate along a second longitudinal axis parallel to the first longitudinal axis,
    d. first complemental securing means adapted to releasably secure the body portion of the head block to the base plate in a first desired position along the first longitudinal axis, and
    e. second complemental securing means adapted to releasably secure the body portion of the tail block to the base plate in a second desired position along the second longitudinal axis, the second longitudinal axis being laterally spaced from the first longitudinal axis whereby longitudinal adjustment of the head and tail blocks to hold the work piece between the head end engaging means and the tail end engaging means may locate the body portion of the head block laterally adjacent the body portion of the tail block.

2. A work piece holder as claimed in claim 1 wherein the first complemental securing means comprises a first longitudinal slot in the base plate extending parallel to said first longitudinal axis and first anchor means secured to the body portion of the head block and adapted to releasably engage the first slot to fix the head block to the base plate in the first desired position; and the second complemental securing means comprises a second longitudinal slot in the base plate extending parallel to said second longitudinal axis and second anchor means secured to the body portion of the tail block and adapted to releasably engage the second slot to fix the tail block to the base plate in the second desired position.

3. A work piece holder as claimed in claim 2 wherein the base plate has a uniform cross section in the shape of first and second steps, the first slot extending along the bight of the first step and the second slot extending along the bight of the second step.

4. A work piece holder as claimed in claim 2 wherein the first and second anchor means comprise mating nuts and bolts, each bolt adapted to be inserted through a hole in a respective body portion of the head and tail blocks to threadably engage a respective enlarged nut retained in the corresponding slot.

5. A work piece holder as claimed in claim 4 wherein the nuts are T-shaped in cross section and the first and second slots have a correspoding uniform T-shaped cross section adapted to retain the said nuts.

6. A work piece holder as claimed in claim 1, wherein the head end engaging means comprises a head center and the tail end engaging means comprises a tail center.

7. A device for holding a variable length work piece having a head end and a tail end during grinding comprising:
   a. a base plate with a uniform step-shaped cross section providing first and second steps with first and second slots extending respectively along the bight of the said steps, each slot having a uniform T-shaped cross section opening onto the respective step,
   b. a head block having a holding portion and a body portion, the holding portion including a head center secured thereto, the body portion being generally rectangular-shaped and adapted to be slidably received in the first step of the base plate,
   c. a tail block having a holding portion and a body portion, the holding portion including a tail center secured thereto, the body portion being generally rectangular-shaped and adapted to be slidably received in the second step of the base plate,
   d. anchor bolts adapted to be received in respective holes in the body portions of the head and tail blocks, and
   e. corresponding anchor nuts retained in the first and second slots, the anchor nuts adapted to respectively threadably receive the anchor bolts to lock the head block and tail block in desired positions along the steps to retain the work piece between the head center and tail center, whereby the head block, tail block and base plate are contructed to permit the said body portions to laterally pass each other during longitudinal adjustment to receive a longer work piece.

* * * * *